Feb. 14, 1961
J. S. OVERHOLSER
2,971,224
METHOD FOR PRODUCING RADAR PROBE
Filed July 28, 1958
2 Sheets-Sheet 2
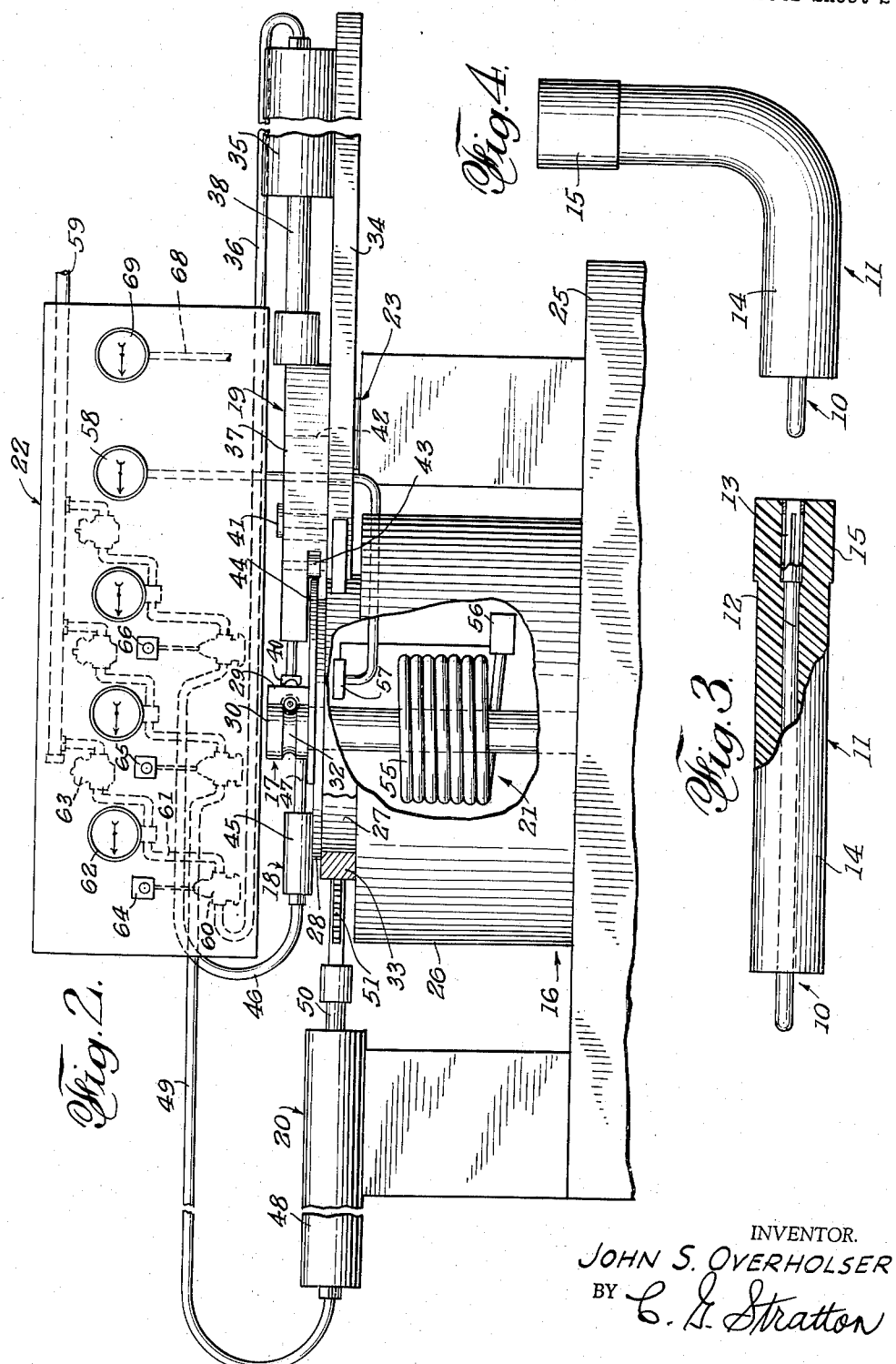
INVENTOR.
JOHN S. OVERHOLSER
BY C. G. Stratton
ATTORNEY 2,971,224

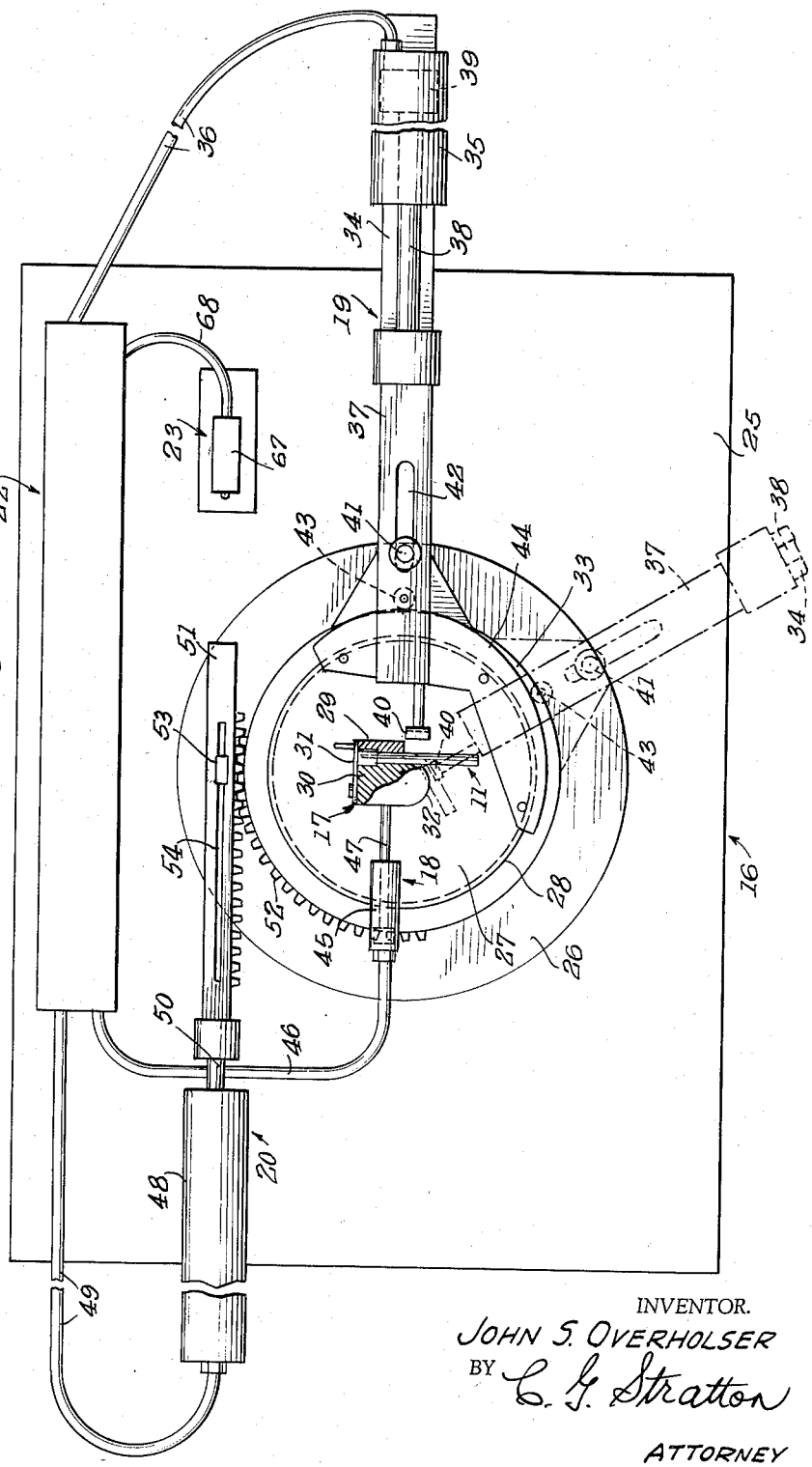

METHOD FOR PRODUCING RADAR PROBE

John S. Overholser, Los Angeles, Calif., assignor, by mesne assignments, to Tamar Electronics, Inc., Gardena, Calif., a corporation of California Filed July 28, 1958, Ser. No. 751,357

8 Claims. (Cl. 18—59)

This invention relates to a method for producing probes such as used in radar wave-guide units and the like or in fittings used in coaxial cables where such cables change direction.

Inasmuch as great accuracy is important in the concentricity of a probe in its box or fitting, it is an object of the present invention to provide novel apparatus facilitating accurate production of a probe. Another object is to provide a novel method for obtaining such accuracy.

Such a probe comprises a metal probe rod covered by a dielectric material of which "Teflon" is preferred, it being a further object of the invention to so control the dielectric material that the same uniformly and intimately covers the rod and is formed to have a uniform cross-section after bending of both the rod and the dielectric cover.

A further object of the invention is to provide a method for making radar probes that insures against distortion, provides for stress relief, and for complete curing of the dielectric, and produces a dependable probe of desired accuracy.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference character designate similar parts in the several views.

Fig. 1 is a plan view of apparatus for bending a probe and for treating the same during the bending process.

Fig. 2 is a front elevational view of said apparatus, with portions broken to show detail.

Fig. 3 is an enlarged elevational view, partly in longitudinal section, of a probe before the same has been bent.

Fig. 4 is a similar elevational view of the completed probe.

With particular reference to Fig. 3, the probe is comprised of a metal probe rod 10, and an enclosing sleeve or cover of a dielectric material 11. In practice, the rod 10 is initially provided as a straight length of brass rod 12 to one end of which is silver-soldered a beryllium slitted sleeve 13 somewhat larger diametrally than the rod. A silver and rhodium flash is provided on the probe rod to insure against corrosion. Such rod is typical and, per se, comprises no part of this invention. Such variations thereof as may be used are also immaterial to the invention.

The cover 11 is advantageously made of "Teflon," a product of E. I. du Pont de Nemours & Co. This dielectric material is described as a plastic consisting of a tetrafluoroethylene polymer that is characterized by outstanding chemical resistance, excellent electrical properties, and good heat stability. Teflon has no true melting point but undergoes a solid-phase transition to a gel at 325° C. with a sharp decrease in strength; and at about 400° C. it decomposes slowly to a gaseous monomer and some gaseous fluorine derivatives. It resists the attack of organic materials. It can be successfully employed over a temperature of —75° to +250° C. It can be machined very easily with standard wood- or metal-working tools.

In the present case, the Teflon is received in the form of semi-cured tubes that have an external diameter larger than the largest finished diameter of the cover or sleeve 11 and a bore of a size to snugly receive the probe rod 10. In this semi-cured commercial state, the sleeve is cut to length and machined down from the original large size to the respective diameters at the body 14 and the larger head 15.

This machining step introduces stresses in the Teflon sleeve and the same is normalized or relieved by heating in an oven at a temperature between about 230° C. and 235° C. The normalizing temperature may be somewhat higher but, in no case, should it approach the range where solid-phase transition may occur. A preferred normalizing time is approximately thirty minutes. Too long heating may cause shape distortion. At about thirty minutes, the Teflon plasticizes sufficiently to remove its temper. In other words, the material has an inelastic or "dead" condition that prevents or minimizes spring back after bending. In this normalized, inelastic condition, the Teflon tube is allowed to return to room temperature or about to 23° to 25° C.

While in the latter condition, the probe rod 10 is inserted into the sleeve 11 to achieve the condition of Fig. 3. The member of Fig. 3 is bent to the form of Fig. 4 or to a comparable bent form by the apparatus shown in Figs. 1 and 2.

Said apparatus is supported on a base 16 and is shown as comprising, generally, a work clamp 17 fixedly mounted on said base, means 18 to operate said clamp, means 19, rotationally mounted on the base, to effect bending of a probe 11, means 20 to move the means 19 in a probe-bending operation, means 21 to heat the probe during bending thereof, means 22 to control the means 18, 19 and 20, and timer means 23 to time the operation after full bending has occurred.

The base 16 is shown as a table 25 on which is provided an upwardly directed fixed housing 26 having a reduced annulus 27 that is provided with a marginal flange 28. Said housing 26 is interiorly hollow.

The work clamp 17 is provided with a fixed member 29 mounted on the top of housing 26, a movable member 30 cooperating with the member 29 to clamp a work piece, such as the probe 11 therebetween, and releasable lock means 31 to connect the members 29 and 30 in locking position, as shown. As can be seen best in Fig. 1, one of the members 29 or 30 is provided with a form surface 32 around which the probe is adapted to be bent. It is the portion of said probe that extends from where the same is clamped between members 29 and 30 that is bent around the form surface 32.

The clamp-operating means 18 is shown as an air cylinder 45 that is supplied with compressed air through a tube 46, said air acting on a piston in said cylinder to project the stem 47. The latter is connected to the movable member 30 of the clamp 17. Thus, the work piece 11 may be clamped and locked against shifting while the same is being bent to the form of Fig. 4 by the means 19.

The means 19 is shown as a collar 33 that is guided on annulus 27 and is held against displacement between the housing 26 and flange 28, an arm 34 extending radially from said collar, an air cylinder 35 affixed to the end of said arm and receptive of pressure air through a tube 36, a slide 37 connected to the stem 38 of a piston 39 operable in said cylinder, and a bending tool 40 carried by the end of the slide and directed to engage and bend the probe upon projection of the slide.

The slide is guided by a stud 41 on the arm 34 and extending through a slot 42 in said slide. A cam follower 43, carried by the slide is in engagement with the contour edge of a cam 44 affixed to the top of the housing annulus 27. The form of the cam contour may be as desired and according to the desired form of bend in the probe. In other words, the cam 44 limits projection of the slide and, therefore, the same controls the degree and tightness of bend of the probe. Air in line 36 projects the slide 37 while any suitable means, such as a return spring in the cylinder 35, may be used to retract said slide. Thus, the cam 44 serves to control the probe-bending projection of the tool 40 which, as shown in Fig. 2, so engages the probe as to deflect the same according to the dot-dash bent position of said figure.

The means 20 for moving the means 19 so as to cause the tool of the latter to bend the probe is shown as an air cylinder 48 that is supplied with compressed air through a tube 49, said air acting on the piston of said cylinder to cause projection of the stem 50. An extension 51 of said stem is formed as a gear rack and is in driving mesh with a segmental gear 52 on the collar 33. As a consequence, projection of the rack 51 causes the arm 34 to swing, as between the two positions shown in Fig. 1 and, therefore, to effect probe bending. A stud 53 on the housing top is guided in a slot 54 formed in the rack to hold the latter against deflection, when being projected.

The area around the probe in its clamped position is preferably heated to about 90° to 100° C., the probe being bent in said heated atmosphere so that the plasticity imparted to the Teflon prevents cracking of the sleeve and greatly facilitates crowding of the Teflon at the inside of the bend and comparable stretching on the outside. This helps retain a central position of the probe rod. The means 21 is provided to effect such heating and is shown as a heating element 55 located interiorly of the housing 26, a thermostat 56 that regulates the temperature of said element and a thermocouple 57 that, in response to the heat generated by the element 55, adjusts the thermostat accordingly. The gauge 58 shows the temperature of said means 21.

The control means 22 is shown best in Fig. 1 and comprises three somewhat similar control circuits to bring compressed air, from a supply pipe 59, to the respective air tubes or lines 36, 46 and 49.

The tube 36 is connected to a solenoid valve 60 that receives flow from a pipe 61 connected to pipe 59 and in which is provided an air gauge 62 and a regulator valve 63. A push button solenoid actuator 64 manually controls actuation of valve 60. Thus, the tool 40 is projected by pushing button 64. In a similar manner, the button 65 may be pushed to cause operation of the means 20, and the button 66 pushed to cause actuation of the clamp means 17.

In the present case, the bending to the probe is accompanied by a time factor to obviate spring back. This factor is introduced through the means 23 which is controlled by the rack 51 of the means 20. Fifteen to twenty seconds is ordinarily enough to hold the tool 40 in its utlimate probe-bending position although tight bends may require a longer time, sometimes as long as one minute.

The means 23 is shown as a switch 67 that is normally open and is closed by the end of rack 51. Said switch is connected by a circuit 68 to a timer 69. By reading the latter, after a probe is bent, the operator may time the period for holding the tool 40 in probe-bending position.

While the present apparatus assures reasonable retention of the cross-sectional size of the Teflon at the bend therein, full assurance of proper size and shape is provided by a subsequent heat-treating step. The bent probe is removed from the clamp means 17 and placed in a two-part case that has a cavity of the exact size required. Ordinarily, the probe will fit loosely in said cavity, i.e., under size thereof. Now, by subjecting the probe to a heat of 170° to 175° C. for a period of about forty minutes, the Teflon is caused to slowly swell to fully fill the cavity and exactly assume the shape thereof. The probe is then removed from this heated case and allowed to cool slowly to room temperature. Such slow cooling helps relieve stresses and is a normalizing step.

Since the Teflon-covered probe is to be embodied in a housing that has a cavity similar to the cavity of the heat-treating case, the Teflon of the probe will totally fill said cavity of the housing or fitting in which used. It follows then that the final heat-treating may take place in such housing or fitting, if there is nothing to prevent subjecting the same to the temperatures involved.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. A method for forming a bend in a probe comprising a metal probe rod and a covering sleeve of a tetrafluorethylene polymer, said method consisting of machining the longitudinal face of the sleeve to a straight size smaller than the ultimate size thereof while the same is in a semi-cured state, normalizing said sleeve for stress relief at a temperature substantially below the gel temperature of the polymer, inserting the probe rod into the straight sleeve, then, while heat is applied in the atmosphere around the sleeve-covered rod, bending the same to the desired shape, and, finally, heat-treating the bent sleeve to swell the same to its ultimate size while limiting the size to which the sleeve swells.

2. A method for forming a bend in a probe comprising a metal probe rod and a covering sleeve of a tetrafluorethylene polymer, said method consisting of machining the longitudinal face of the sleeve to a straight size smaller than the ultimate size thereof while the same is in a semi-cured state, normalizing said sleeve for stress relief at a temperature substantially below the gel temperature of the polymer, inserting the probe rod into the straight sleeve, then, while heat is applied in the atmosphere around the sleeve-covered rod, bending the same to the desired shape, placing the bent probe into a cavity of predetermined ultimate size and shape of the probe, and, finally, heating the sleeve to cause the same to swell and fill the cavity.

3. A method for forming a bend in a probe comprising a metal probe rod and a covering sleeve of a tetrafluorethylene polymer, said method consisting of machining the longitudinal face of the sleeve to a straight size smaller than the ultimate size thereof while the same is in a semi-cured state, normalizing said sleeve for stress relief at a temperature substantially below the gel temperature of the polymer, inserting the probe rod into the straight sleeve, then, while heat is applied in the atmosphere around the sleeve-covered rod, bending the same to the desired shape, maintaining bending force on the probe for a period of at least about fifteen seconds, placing the bent probe into a cavity of predetermined ultimate size and shape of the probe, and, finally, heating the sleeve to cause the same to swell and fill the cavity to its ultimate size while limiting the size to which the sleeve swells.

4. A method according to claim 2 in which the straight sleeve, before the rod is inserted thereinto, is heated for normalizing purposes in the approximate range of 230° to 235° C.

5. A method according to claim 2 in which the temperature under which the probe is bent approximates 95° to 100° C.

6. A method according to claim 2 in which the temperature under which the probe is bent approximates 95° to 100° C., and the bending time maintained for fifteen seconds to one minute.

7. A method according to claim 2 in which the heat-treating step is carried out at a temperature of about 170° to 175° C.

8. A method according to claim 2 in which the heat-treating step is carried out at a temperature of about 170° to 175° C. for about forty minutes.

References Cited in the file of this patent

UNITED STATES PATENTS

| | | |
|---|---|---|
| 1,626,190 | Elliot | Apr. 26, 1927 |
| 2,456,262 | Fields | Dec. 14, 1948 |
| 2,480,774 | Rossheim et al. | Aug. 30, 1949 |
| 2,602,962 | Deakin | July 15, 1952 |
| 2,617,150 | Rubin | Nov. 11, 1952 |
| 2,620,848 | DePaoli | Dec. 9, 1952 |
| 2,687,162 | Smith | Aug. 24, 1954 |
| 2,715,617 | White | Aug. 16, 1955 |
| 2,781,552 | Gray | Feb. 19, 1957 |
| 2,855,019 | Engbert | Oct. 7, 1958 |

FOREIGN PATENTS

| | | |
|---|---|---|
| 588,648 | Great Britain | May 29, 1947 |

OTHER REFERENCES

"Teflon," Du Pont Information Bulletin No. Z-7c, July 1957, 11 pages, page 9 relied upon.